(12) United States Patent
Rolleston et al.

(10) Patent No.: US 8,196,040 B2
(45) Date of Patent: Jun. 5, 2012

(54) COLOR MANAGEMENT SYSTEM AND METHOD USING NATURAL LANGUAGE DESCRIPTION OF COLOR DIFFERENCES

(75) Inventors: Robert J. Rolleston, Rochester, NY (US); Jutta K. Willamowski, Grenoble (FR); Frederic Roulland, Le Versoud (FR); David B. Martin, Grenoble (FR); Jacki O'Neill, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 350 days.

(21) Appl. No.: 12/464,212

(22) Filed: May 12, 2009

(65) Prior Publication Data

US 2010/0293458 A1 Nov. 18, 2010

(51) Int. Cl.
*G06F 17/00* (2006.01)
*G06F 15/00* (2006.01)

(52) U.S. Cl. ........ 715/275; 715/205; 715/273; 715/276; 358/1.9

(58) Field of Classification Search .................. 715/200, 715/201, 202, 203, 204, 205, 229, 233, 234, 715/243, 256, 273, 274, 275, 276, 277, 700, 715/746, 760, 764; 358/1.2, 1.9, 3.11, 3.12, 358/3.21, 480, 528, 532, 537
See application file for complete search history.

(56) References Cited

U.S. PATENT DOCUMENTS

| | | | |
|---|---|---|---|
| 7,263,221 | B1 | 8/2007 | Moriwaki |
| 7,339,700 | B2 * | 3/2008 | Ohga et al. .............. 358/1.9 |
| 2003/0128376 | A1 | 7/2003 | Simpson et al. |
| 2005/0036162 | A1 | 2/2005 | Edge et al. |
| 2007/0008557 | A1 | 1/2007 | Harrington et al. |
| 2007/0008559 | A1 | 1/2007 | Rich et al. |
| 2008/0007749 | A1 | 1/2008 | Woolfe |
| 2008/0180704 | A1 | 7/2008 | Kametani |
| 2008/0204829 | A1 | 8/2008 | Harrington |

FOREIGN PATENT DOCUMENTS

| | | |
|---|---|---|
| EP | 0 448 250 A1 | 9/1991 |
| EP | 0 946 050 A2 | 9/1999 |

(Continued)

OTHER PUBLICATIONS

Thomas, Candi, "Word Compare and Merge Documents," http://pubs.logicalexpressions.com/Pub0009/LPMArticle.asp?ID=647, Mar. 26, 2006.*

(Continued)

*Primary Examiner* — Maikhanh Nguyen
(74) *Attorney, Agent, or Firm* — Gibb & Riley, LLC

(57) ABSTRACT

Disclosed are embodiments of a color management system and an associated method that display a visual representation of a digital version of a document and further annotate selected object(s) in the visual representation with corresponding statement(s) containing a natural language description of any color differences between the selected object and the same object in a different digital version of the same document. For example, a visual representation of the print-preview version of a document can be displayed and a selected object within the visual representation can be annotated with a statement containing a natural language description of any color differences between the selected object and the same object in the selected-for-print-preview version of the document. By annotating selected object(s) on the display in this manner, the embodiments provide an accurate indication of color variations between the two versions even in a non-calibrated and/or non-optimal viewing environment.

17 Claims, 4 Drawing Sheets

FOREIGN PATENT DOCUMENTS

| | | |
|---|---|---|
| EP | 1 294 178 A2 | 3/2003 |
| EP | 1 804 134 A2 | 7/2007 |

OTHER PUBLICATIONS

Microsoft Word 2002; Copyright Microsoft Corporation 1983-2001, Screen Shots pp. 1-6.*
European Search Report, Application No. EP 10 16 1954, Aug. 20, 2010, 7 pages.
Disclosed Anonymously, "Method to translate color requirements from a natural language-like representation into standard color references," Research Disclosure, Mason PublicationsHampshire, GB, vol. 503, No. 65, Mar. 1, 2006, XP007136036, ISSN: 0374-4353. 4 pages.
Woolfe et al., "Natural Language Color Editing", Proceedings of the Xerox Innovation Group, Conference, 2006, pp. 122-125, Webster, NY.
Roulland et al., U.S. Appl. No. 12/138,846, filed Jun. 13, 2008.
Rolleston et al., U.S. Appl. No. 11/857,572, filed Sep. 19, 2007.
Hayward et al., U.S. Appl. No. 12/287,122, filed Oct. 6, 2008.

* cited by examiner

COLOR MANAGEMENT SYSTEM AND METHOD USING NATURAL LANGUAGE DESCRIPTION OF COLOR DIFFERENCES

BACKGROUND AND SUMMARY

Embodiments herein generally relate to color management in digital image processing and, more particularly, to a color management system and an associated method that provide user's with a natural language description to explain color differences between the same objects in two different versions of the same digital document (e.g., an original version and a print-preview version).

Soft-proofing in the context of color management in digital image processing is a term of art generally understood to mean evaluating the colors of objects within a displayed visual representation of a digital version of a document. For example, as disclosed in U.S. patent application Ser. No. 12/138,846 of Roulland et al., filed on Jun. 13, 2008, assigned to Xerox Corporation of Norwalk, Conn., USA, and incorporated herein by reference in its entirety, the color gamut, emulation profiles, and color rendering settings of a printing apparatus may result in color variations between objects in a digital version of a document and the same objects in a printed version of the document. In order to preemptively address such color variation issues, color management systems allow a user to soft-proof a displayed print-preview version of the document to ensure that, when the document is eventually printed by the printing apparatus, the colors of objects within the printed document will be identical to or will vary within acceptable limits from the colors of the same objects in an accepted digital version of the document (e.g., an original digital version of the document, as input into or generated by the system). Thus, soft-proofing constitutes an important final verification step before sending a document to a printing apparatus. The clear advantage of soft-proofing over printed-proofing is to enable quick, effective and remote proofing without producing a physical print out (i.e, without wasting time, paper and ink).

Currently, in order to be effective, soft-proofing must be performed in a calibrated and optimal viewing environment. That is, the visual display unit (i.e., the display, monitor, screen, etc.) must be correctly calibrated for lightness, chroma, hue, etc. so that the colors appearing in the displayed print-preview version of the document are the same as the colors that would appear in the printed document. Furthermore, the lighting conditions must be optimal so that the user's visual perception is not hindered. Without proper visual display unit calibration and without optimal lighting conditions, the trustworthiness and, thereby the usefulness of soft-proofing becomes limited. Unfortunately, visual display unit calibration requires proper calibration tools, a certain competency level to operate such tools, and a significant amount of time to perform such a calibration process. Furthermore, optimal viewing conditions are not always possible to achieve.

In view of the foregoing disclosed herein are embodiments of a color management system and an associated method that display a visual representation of a digital version of a document and further annotate selected object(s) in the visual representation with corresponding statement(s) containing a natural language description of any color differences between the selected object and the same object in a different digital version of the same document. For example, a visual representation of the print-preview version of a document can be displayed and a selected object within the visual representation can be annotated with a statement containing a natural language description of any color differences between the selected object and the same object in the selected-for-print-preview version of the document. By annotating selected object(s) on the display in this manner, the embodiments provide an accurate indication of color variations between the two versions even in a non-calibrated and/or non-optimal viewing environment.

More particularly, disclosed herein are embodiments of a color management system. The color management system embodiments can comprise a processor. This processor can compare the colors of selected object(s) in two different versions of the same document (i.e., a first digital version and a second digital version). For example, the first digital version can comprise a selected-for-print-preview digital version of a document (e.g., a specific electronic file selected by a user for printing) and the second digital version can comprise a print-preview digital version of the same document. This print-preview digital version can be created based on the selected-for-print-preview digital version and on a color profile of a specific printing apparatus.

During the comparison process and for each selected object, the processor can determine a difference between a first color of the selected object in the first digital version and a second color of the same object in the second digital version of the document. Then, the processor can generate a descriptive statement providing a natural language description of any differences between the first color and the second color (including, if applicable, a statement that there are no differences). Specifically, this descriptive statement can indicate, using a natural language description, any of the following: a difference in lightness between the first color and the second color, a difference in chroma between the first color and the second color, a difference in hue between the first color and the second color. The descriptive statement can further indicate, again using a natural language description, the magnitude of any of the above-listed differences (i.e., the magnitude of the difference in lightness, the difference in chroma and/or the difference in hue). The descriptive statement can also indicate a change in color name.

The color management system embodiments can further comprise a graphical user interface (GUI) comprising a visual display unit. This GUI can display, on the visual display unit, a visual representation of the second digital version of the document. The GUI can further annotate the selected object with the descriptive statement. That is, the GUI can also display, on the visual display unit, the descriptive statement such that it is associated in some manner with the selected object. Optionally, the GUI can simultaneously display a visual representation of the first digital version of the document to allow a side-by-side comparison. Additionally, in response to such a descriptive statement, the GUI can receive, from a user, a request to adjust the second color (e.g., towards the first color or towards a different color, depending upon the application). In this case, a second natural language descriptive statement can be generated by the processor and annotated to the object. This second natural language descriptive statement can describe either one or more possible solutions that the user may choose to implement or a best possible solution automatically implemented by the processor.

It should be noted that the selection of which object or objects from the document will be processed, as described above, can be made automatically by the processor based on predetermined conditions, a priori by the user, and/or dynamically by the user. That is, the processor can automatically select an object from amongst a plurality of objects in a document based on the occurrence of one or more predetermined conditions. These predetermined conditions can include, but are not limited to, the difference between the first color of an object in the first digital version of the document and the second color of that same object in the second digital version of the document exceeding a predetermined color change threshold, the difference between the first color of an object in the first digital version of the document and the second color of that same object in the second digital version of the document crossing a color boundary (e.g., a perceptual color boundary or an analytic color boundary), and the size of an object exceeding a predetermined size threshold. Additionally and/or alternatively, a user can pre-select an object from amongst a plurality of objects in the document (e.g., based on its perceived importance) prior to display of the visual representation by the GUI and/or can dynamically select an object from amongst a plurality of objects in the document (e.g., based on a perceived color difference or lack thereof) after display of the visual representation by the GUI.

Also disclosed herein are embodiments of an associated computer-implemented color management method. The color management method embodiments can comprise comparing, by a processor, the colors of selected object(s) in two different versions of the same document (i.e., a first digital version and a second digital version). For example, the first digital version can comprise a selected-for-print-preview digital version of a document (e.g., a specific electronic file selected by a user for printing) and the second digital version can comprise a print-preview digital version of the same document. This print-preview digital version can be created based on the selected-for-print-preview digital version and on a color profile of a specific printing apparatus.

During the comparison process and for each selected object, a difference between a first color of the selected object in the first digital version and a second color of the same object in the second digital version of the document can be determined. Next, a descriptive statement providing a natural language description of any differences between the first color and the second color (including, if applicable, a statement that there are no differences) can be generated. This descriptive statement can indicate, using a natural language description, any of the following: a difference in lightness between the first color and the second color, a difference in chroma between the first color and the second color, a difference in hue between the first color and the second color. The descriptive statement can further indicate, again using a natural language description, the magnitude of any of the above-listed differences (i.e., the magnitude of the difference in lightness, the difference in chroma and/or the difference in hue).

The color management method embodiments can further comprise displaying, on a visual display unit of a graphical user interface (GUI), a visual representation of the second digital version of the document and further annotating the selected object with the descriptive statement. That is, the descriptive statement can also be displayed on the visual display unit such that it is associated in some manner with the selected object. Optionally, a visual representation of the first digital version of the document can be simultaneously displayed to allow a side-by-side comparison. After a user has viewed the displayed visual representation, including the descriptive statement, a request can be received from a user to adjust the second color (e.g., towards the first color or towards a different color, depending upon the application. Additionally, in response to such a descriptive statement, a request to adjust the second color (e.g., towards the first color or towards a different color, depending upon the application) can be received. In this case, a second natural language descriptive statement can be generated and annotated to the object. This second natural language descriptive statement can describe either one or more possible solutions that the user may choose to implement or a best possible solution automatically implemented by the processor.

It should be noted that the selection of which object or objects from the document will be processed, as described above, can be made automatically based on predetermined conditions, a priori by the user, and/or dynamically by the user. That is, the method embodiments can comprise automatically selecting an object from amongst a plurality of objects in a document based on the occurrence of one or more predetermined conditions. These predetermined conditions can include, but are not limited to, the difference between the first color of an object in the first digital version of the document and the second color of that same object in the second digital version of the document exceeding a predetermined color change threshold, the difference between the first color of an object in the first digital version of the document and the second color of that same object in the second digital version of the document crossing a color boundary (e.g., a perceptual color boundary or an analytic color boundary), and the size of an object exceeding a predetermined size threshold. Additionally and/or alternatively, the method embodiment can comprise receiving one or more object selections from a user (i.e., selections of specific object(s) from amongst a plurality of objects in the document) prior to displaying the visual representation (e.g., based on its perceived importance) and/or, after displaying the visual representation (e.g., based on a perceived color difference or lack thereof).

Finally, also disclosed herein are embodiments of a computer program product comprising a computer usable medium having computer useable program code embodied therewith, the computer usable program code being configured to perform a color management method embodiments.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
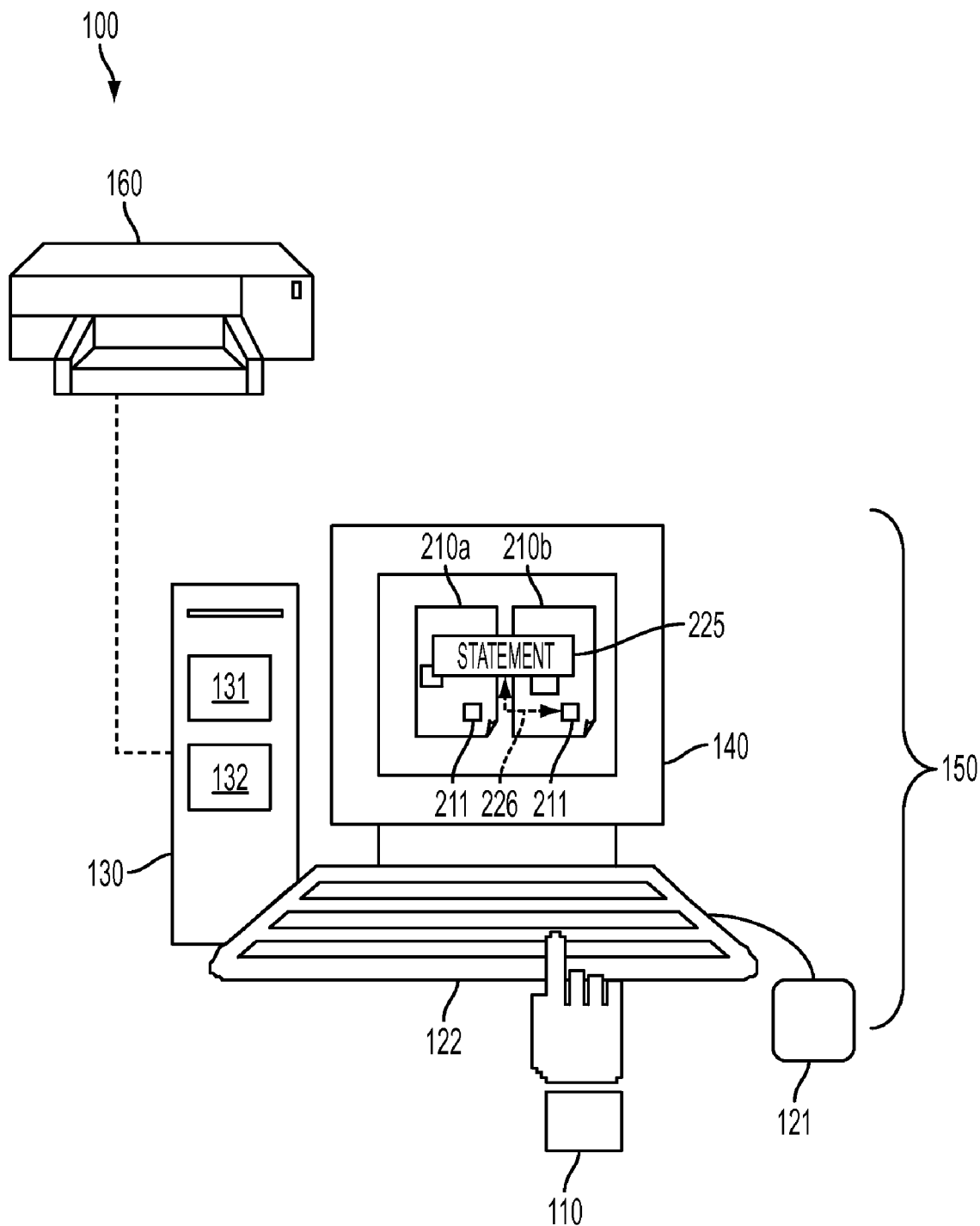
FIG. 1 is a schematic diagram of an embodiment of a color management system.

The embodiments disclosed herein and the various features and advantageous details thereof are explained more fully with reference the accompanying drawings and detailed in the following description.

As mentioned above, soft-proofing in the context of color management in digital image processing is a term of art generally understood to mean evaluating the colors of objects within a displayed visual representation of a digital version of a document. For example, as disclosed in U.S. patent application Ser. No. 12/138,846 of Roulland et al., filed on Jun. 13, 2008, assigned to Xerox Corporation of Norwalk, Conn., USA, and incorporated herein by reference in its entirety, the color gamut, emulation profiles and color rendering settings of a printing apparatus may result in color variations between objects in a digital version of a document and the same objects in a printed version of the document. In order to preemptively address such color variation issues, color management systems allow a user to soft-proof a displayed print-preview version of the document to ensure that, when the document is eventually printed by the printing apparatus, the colors of objects within the printed document will be identical to or will vary within acceptable limits from the colors of the same objects in an accepted digital version of the document (e.g., an original digital version of the document, as input into or generated by the system). Thus, soft-proofing constitutes an important final verification step before sending a document to a printing apparatus. The clear advantage of soft-proofing over printed-proofing is to enable quick, effective and remote proofing without producing a physical print out (i.e, without wasting time, paper and ink).

Currently, in order to be effective, soft-proofing must be performed in a calibrated and optimal viewing environment. That is, the visual display unit (i.e., the display, monitor, screen, etc.) must be correctly calibrated for lightness, chroma, hue, etc. so that the colors appearing in the displayed print-preview version of the document are the same as the colors that would appear in the printed document. Furthermore, the lighting conditions must be optimal so that the user's visual perception is not hindered. Without proper visual display unit calibration and without optimal lighting conditions, the trustworthiness and, thereby the usefulness of soft-proofing becomes limited. Unfortunately, visual display unit calibration requires proper calibration tools, a certain competency level to operate such tools, and a significant amount of time to perform such a calibration process. Furthermore, optimal viewing conditions are not always possible to achieve.

In view of the foregoing disclosed herein are embodiments of a color management system and an associated method that display a visual representation of a digital version of a document and further annotate selected object(s) in the visual representation with corresponding statement(s) containing a natural language description of any color differences between the selected object and the same object in a different digital version of the same document. For example, a visual representation of the print-preview version of a document can be displayed and a selected object within the visual representation can be annotated with a statement containing a natural language description of any color differences between the selected object and the same object in the selected-for-print-preview version of the document. By annotating selected object(s) on the display in this manner, the embodiments provide an accurate indication of color variations between the two versions even in a non-calibrated and/or non-optimal viewing environment.

More particularly, referring to FIG. 1, disclosed herein are embodiments of a color management system 100. The color management system embodiments 100 can be implemented on a computer 130. This computer 130 can comprise, for example, a desktop computer, as illustrated, a laptop computer, a handheld computing device, a personal digital assistant (PDA), a remote computing service, etc. The computer 130 can comprise a graphical user interface (GUI) 150 and processor 131. It should be noted that while the computer 130 is described above as comprising a discrete unit (e.g., a desktop or laptop computer), this computer 130 can alternatively comprise a control station integrated into a printing device, copier, scanner, modular printing system, multi-function printer-copier-scanner, etc. Such a control station can comprise a programmable, self-contained, dedicated mini-computer having a central processor unit (CPU), electronic storage, and graphical user interface 150.

The GUI 150 can comprise a conventional GUI having a plurality of components allowing for interactions with a user 110, including but not limited to, input devices (e.g., a keyboard 121, mouse 122, or any other suitable input device) and a visual display unit 140 (i.e., a monitor or screen). Specifically, the GUI 150 can receive from a user 150 a request to compare colors in two different versions of the same document (i.e., a first digital version 210a and a second digital version 210b). For example, the first digital version 210a can comprise a selected-for-print-preview digital version of a document (e.g., a specific electronic file stored in memory 132 and selected by a user 110 for print-preview). The second digital version 210b can comprise the print-preview digital version of the same document (i.e., a digital version of what the printed document is expected to look like), created based on the selected-for-print-preview digital version and on a color profile of a specific printing apparatus 160 (e.g., a selected or a default printing apparatus). It should be noted that the specific printing apparatus 160 may or may not be integral with the computer 130 (see discussion above, indicating that the computer 130 may be a discrete unit or may be a controller station integrated into a printing device, etc.). It should further be noted, as discussed in detail below, the embodiments disclosed herein are not limited to printing applications.

The computer 130 can further comprise a processor 131. The processor 131 can compare (i.e., can be adapted to compare or, more specifically, can be configured to access and execute program code in order to compare) the colors of selected object(s) 211 in two different versions of the same document (i.e., a first digital version and a second digital version). During the comparison process and for each selected object 211, the processor 131 can determine a difference between a first color of the selected object 211 in the first digital version 210a and a second color of the same object 211 in the second digital version 210b of the document.

Then, the processor 131 can generate (i.e., can be adapted to generate or, more specifically, can be configured to access and execute program code in order to generate) a descriptive statement 225 providing a natural language description of any differences between the first color and the second color (including, if applicable, a statement that there are no differences). The descriptive statement 225 can indicate, using a natural language description, any of the following: a difference in lightness between the first color and the second color, a difference in chroma between the first color and the second color, a difference in hue between the first color and the second color. The descriptive statement 225 can further indicate, again using a natural language description, the magnitude of any of the above-listed differences (i.e., the magnitude of the difference in lightness, the difference in chroma and/or the difference in hue or a change in color name). In short, the processor 131 computes, summarizes and translates the selected object's change in color into a natural language description.

Specifically, for each selected object 211, the first color $C_1$ of the object 211 as exhibited in the first digital version 210a and the second color $C_2$ of the same object 211 as exhibited in the second digital version 210b are compared. The difference between $C_1$ and $C_2$ will be the color change $\Delta C$. The colors $C_1$ and $C_2$ can typically each be defined in a known colorimetric space such as CIELAB of CIELCH. The $\Delta C$ is a vector in 3-space that will be described in the statement 225 using a natural language color description, for example, as described in U.S. patent application Ser. No. 11/857,572 of Rolleston et al., filed on Sep. 19, 2007, assigned to Xerox Corporation of Norwalk, Conn., USA, and incorporated herein by reference in its entirety. This statement 225 can specifically describe in natural language the ΔC vector using several attributes, including but not limited to the following: (1) What color has changed? (i.e., the starting point of the vector, the first color $C_1$); (2) In which direction has the color changed? (i.e., the direction in color space from $C_1$ to $C_2$); and (3) What is the magnitude of the change? (i.e., what is the absolute color difference between $C_1$ and $C_2$).

More specifically, the colors $C_1$ and $C_2$ can be described within the statement 225 in natural language using any of a set of color descriptors. One such set of color descriptors is the National Bureau of Standards Color Name Dictionary (see Kenneth L. Kelly and Deanne B. Judd. "*Color: Universal Language and Dictionary of Names*", National Bureau of Standards, Spec. Publ. 440, December 1976, 189 pages). However, one could in practice use any convenient, suitable, color name space dictionary, including a color name dictionary developed only for use by a particular user. The requirement is only that any color $C_1$ and $C_2$ be mapped to a finite set of language-based color definitions.

In one embodiment the algorithm will simply find the named colors in the dictionary that are closest to the colors $C_1$ and $C_2$. The definition of "close" may be a Euclidean distance, any of a standard color difference definitions, or some defined perceptual importance. In another embodiment, it is not even necessary to name the colors $C_1$ and $C_2$. That is, it is only necessary to describe the direction of the color change ΔC between $C_1$ and $C_2$. The direction of the color change should be in a language that matches the user's perception of the resulting color change ΔC. For example, the statement 225 could describe the color change ΔC between $C_1$ and $C_2$ in terms of lightness (e.g., Is the second color $C_2$ lighter or darker than the first color $C_1$?), chroma (e.g., Is the second color $C_2$ more or less saturated (i.e., near or further from the neutral axis) than the first color $C_1$? Or Is the second color $C_2$ more or less rich than the first color $C_1$?), and hue (e.g., Has the second color $C_2$ moved more away from one color in a hue circle and towards another color as compared to $C_1$, such as, is $C_2$ more orange and less yellow $C_1$?). Additionally, the magnitude of each of the color change directions can also be described in the statement in a perceptually meaningful way. For example, adjectives describing the relative magnitude of color change in a given direction (i.e., in lightness, chroma, and hue) may include, but are not limited to the following: none or unchanged, very slightly more, very slightly less, somewhat more, somewhat less, much more, much less, very much more, very much less, etc. The mapping of the analytic difference and the descriptive difference can be pre-defined using a set of thresholds, or could be learned by user interaction.

Figure 2:
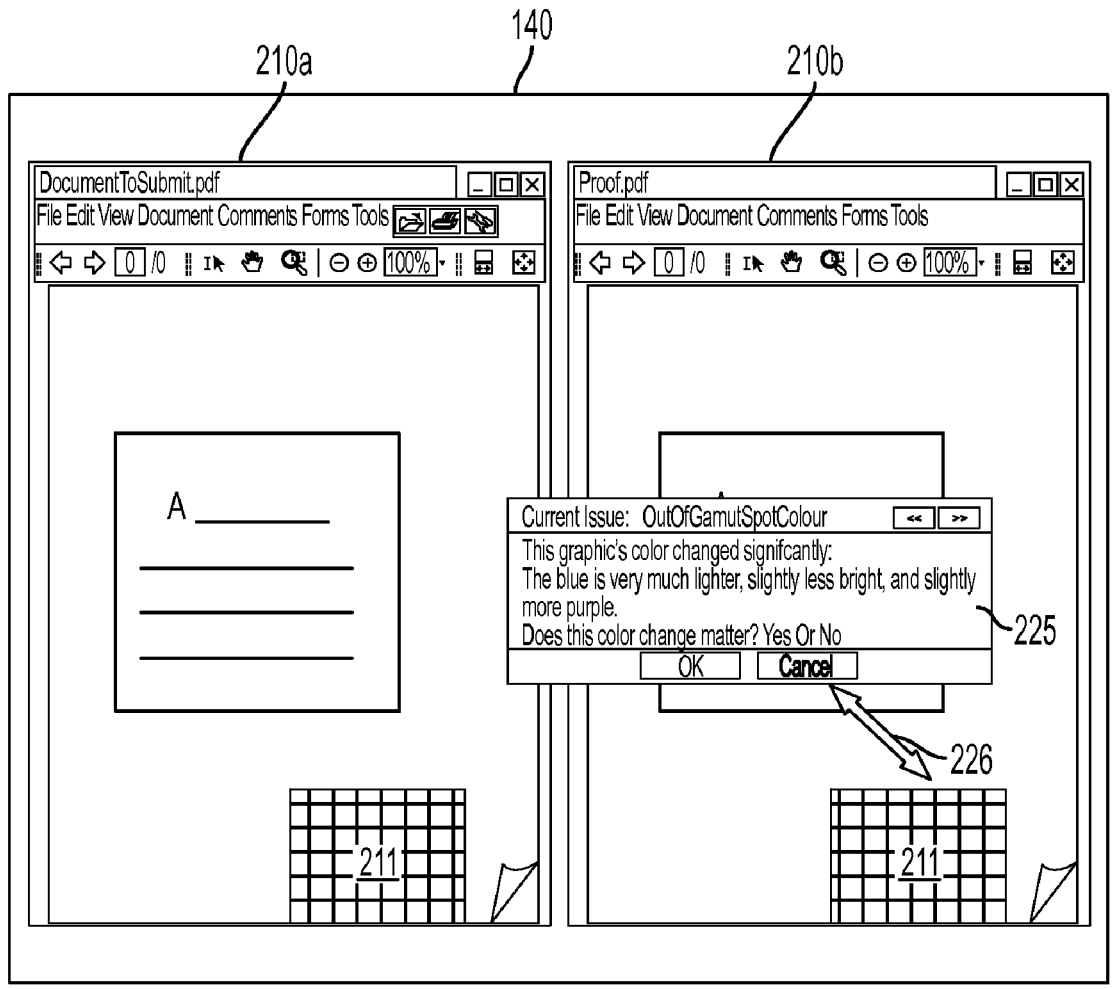
FIG. 2 illustrates an exemplary interface display presented to a user.

The GUI 150 can display, on the visual display unit 140 to the user 110, a visual representation of the second digital version 210b of the document (e.g., in PDF format). In addition, the GUI 150 can annotate the selected object 211 with the descriptive statement 225 generated by the processor 131. That is, the GUI 150 can also display, on the visual display unit 140 to the user 110, the descriptive statement 225 such that it is associated in some apparent manner with the selected object 211. For example, as illustrated in FIG. 2, the statement 225 can be displayed in a pop-up window associated, for example, by connector 226 with the selected object 211. Alternatively, the statement 225 can be placed in a given location on the display (e.g., in a side or bottom panel) and both the statement 225 and the selected object can be flagged with the same corresponding reference number, symbol or the like. Optionally, the GUI 150 can simultaneously display, on the visual display unit 140 to the user 110, a visual representation of the first digital version 211a of the document (e.g., in PDF format) to allow the user 110 to perform a side-by-side visual comparison in addition to receiving the descriptive statement 225.

Figure 3:
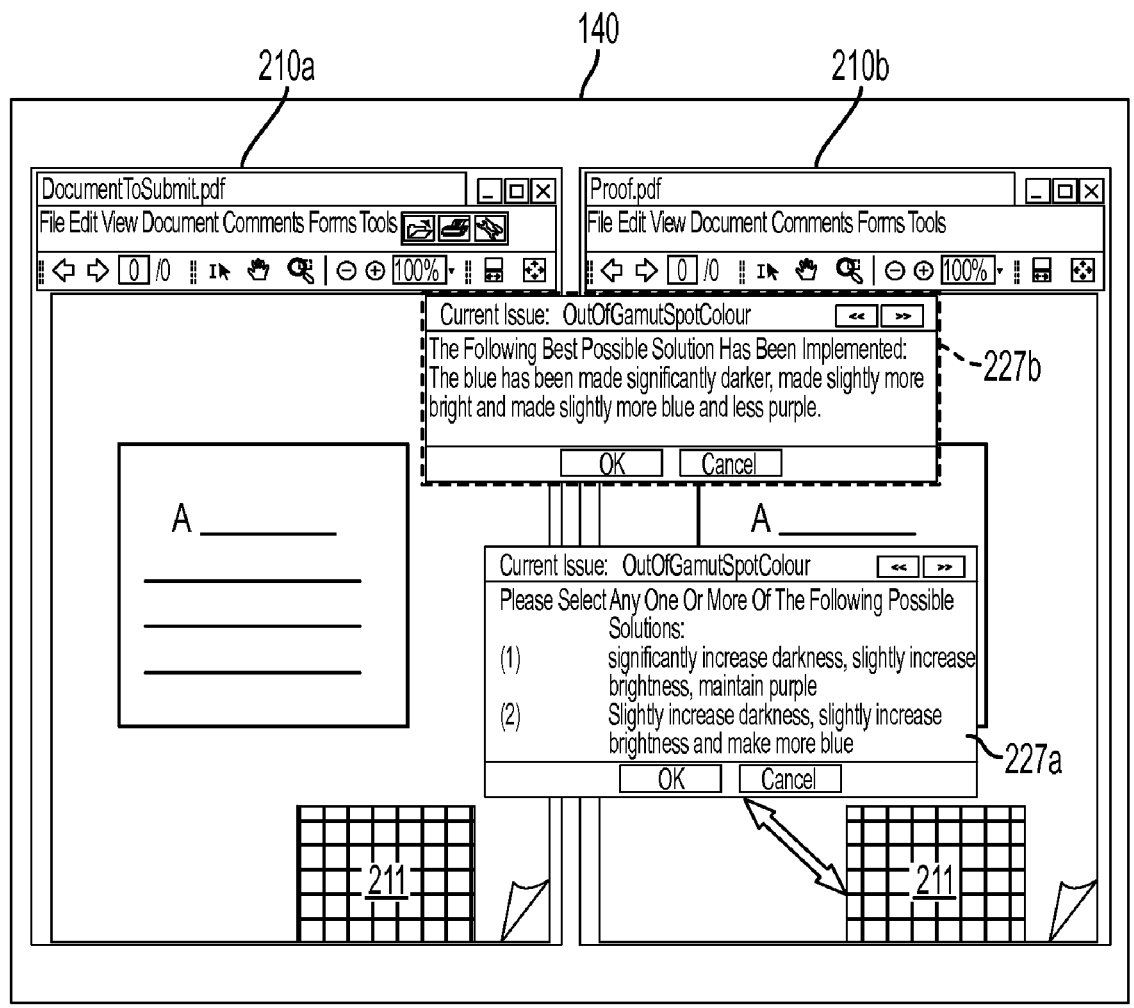
FIG. 3 illustrates another exemplary interface display presented to a user.

Furthermore, in response to the displayed descriptive statement 225, the GUI 150 can receive a request from the user 110 to adjust the second color (e.g., towards the first color or towards a different color, depending upon the application). In response to such a request, the processor 131 can determine (i.e., can be adapted to determine or, more specifically, can be configured to access and execute program code in order to determine) at least one possible solution for adjusting the second color, as requested, and can generate a second descriptive statement providing a natural language description of the possible solution(s). The GUI 150 can then annotate the object 211 with this second descriptive statement 227a (i.e., the GUI 150 can display, on the visual display unit 140 to the user 110, the second descriptive statement 227a such that it is associated in some apparent manner with the selected object 211) and further can allow the user to select and initiate one of the possible solution(s), on demand (see the exemplary display screen illustration of FIG. 3). Alternatively, the processor 131 can determine and automatically implement a best possible solution for adjusting the second color, as requested, and can further generate a second descriptive statement providing a natural language description of the best possible solution, as implemented. The GUI 150 can then annotate the object 211 with this second descriptive statement 227b (i.e., the GUI 150 can display, on the visual display unit 140 to the user 110, the second descriptive statement 227b such that it is associated in some apparent manner with the selected object 211) (see exemplary display screen illustration of FIG. 3).

After color adjustments to the second digital version 210b of the document, thereby creating a revised second digital version, the revised second digital version can be physically printed on a print medium, for example, by the specific printing apparatus 160 using toners or inks. Thus, the embodiments disclosed herein provide a physical transformation by changing the actual appearance of the printed object from what would have been printed without the aforementioned color adjustments.

It should be noted that the selection of which object 211 or objects from the document will be processed, as described above, can be made automatically by the processor 131 based on predetermined conditions, a priori by the user, and/or dynamically by the user. That is, the processor 131 can automatically select an object 211 from amongst a plurality of objects in a document based on the occurrence of one or more predetermined conditions. These predetermined conditions can include, but are not limited to, the difference between the first color of an object in the first digital version 210b of the document and the second color of that same object in the second digital version of the document exceeding a predetermined color change threshold, the difference between the first color of an object in the first digital version 210a of the document and the second color of that same object in the second digital version 210b of the document crossing a color boundary (e.g., a perceptual color boundary or an analytic color boundary), and the size of an object exceeding a predetermined size threshold. Additionally and/or alternatively, a user 110 can pre-select an object 211 from amongst a plurality of objects in the document (e.g., based on its perceived importance) prior to display of the visual representation by the GUI 150. For example, the selected object may represent a company logo (which must comply with the company color policy), a company product (for which a customer's purchasing decision will be based at least in part on color), etc. Additionally and/or alternatively, a user 110 can dynamically select an object 211 from amongst a plurality of objects in the document after display of the visual representation by the GUI 150. For example, using an input device 121 or 122, a user may select an object 211 on demand based, for example, on a perceived color difference or lack thereof.

One particular embodiment of the disclosed color management system 100 can be implemented for soft-proofing in conjunction with a printing application. That is, as discussed above, due to the color profile of a specific printing apparatus 160 (e.g., a selected or a default printing apparatus), the colors of objects in a physically printed-out version of a document may vary from the colors of the same objects in the selected-for-print-preview digital version 210*a* of that document. As discussed in U.S. patent application Ser. No. 12/138,846 of Roulland et al., incorporated by reference above, and further in U.S. Patent Application Publication No. 2008/0204829 of Harrington, published on Aug. 28, 2008, assigned to Xerox Corporation, Norwalk, Conn. and incorporated herein by reference, this is because printers can only print a finite set of colors. The color profile (i.e., the output profile) of a specific printing apparatus characterizes the gamut (i.e., the range) of possible colors which can be printed by that specific printing apparatus. Colors which can not generally be reproduced by the specific printing apparatus are referred to as being "out of profile" or "out of gamut".

Soft-proofing entails creating a print-preview version 210*b* of the document (e.g., based on the selected-for-print-preview digital version 210*a* and on the color profile of the specific printing apparatus 160) and displaying a visual representation of the print-preview digital version 210*b* in order to inform a user of any color variations that will occur with printing and to allow a user to make adjustments, if desired and possible (e.g., see U.S. Patent Application Publication No. 2007/0008557 of Harrington et al., published on Jan. 11, 2007, assigned to Xerox Corporation, Norwalk, Conn. and incorporated herein by reference in its entirety). Unfortunately, with such soft-proofing, if the viewing environment is not ideal, the displayed and/or perceived colors may not be accurate. This embodiment improves upon prior art soft-proofing techniques so that soft-proofing can be performed in less than ideal viewing environments.

Specifically, in this embodiment, the first digital version 210*a* can comprise a selected-for-print-preview digital version of a document (e.g., a specific electronic file selected by a user for printing) and the second digital version 210*b* can comprise a print-preview digital version of the same document. This print-preview digital version 210*b* can be created based on the selected-for-print-preview digital version 210*a* and on a color profile of a specific printing apparatus 160 (e.g., a selected or a default printing apparatus), using known techniques (e.g., as disclosed in U.S. Patent Application Publication No. 2007/0008557 of Harrington et al., incorporated by reference above).

Then, during the comparison process, the processor 131 can determine the difference between a first color of a selected object 211 in the selected-for-print-preview digital version 210*a* and a second color of the same object 211 in the print-preview digital version 210*b* of the document. Then, as discussed in detail above, the processor 131 can generate a descriptive statement providing a natural language description of any differences between the first color and the second color (including, if applicable, a statement that there are no differences) and the GUI 150 can display, on the visual display unit 140, a visual representation of the print-preview digital version 210*b* of the document and can further annotate the object 211 on the display 140 with the descriptive statement 225, as illustrated in the exemplary display screen illustration of FIG. 2. Optionally, the GUI 150 can simultaneously display a visual representation of the selected-for-print-preview digital version 210*a* of the document to allow the user 110 to perform a side-by-side visual comparison in addition to receiving the descriptive statement 225. This embodiment enables quick, effective and remote soft-proofing of the print-preview version 210*b* of the document even in a less than ideal viewing environment (e.g., in the presence of an improperly calibrated visual display unit and/or less than optimal lighting conditions) because the object 211 is annotated on the display 140 with a descriptive statement 225 of any color differences and the content of this descriptive statement 225 is not impacted by the user's viewing environment. Thus, the user 110 is presented with accurate information regarding any color changes that will occur in the printed document, despite any inaccuracies in the actually displayed and/or perceived colors.

After reviewing the displayed information, including the statement 225, the user 110 can determine the importance of the selected object 211 with respect to the document intent and can further decide if the object's color change is relevant or not (i.e., if a color adjustment is required to move the second color of the object 211 on the print preview version 210*b* back towards the first color of the object 211 on the selected-for-print-preview version 210*b*). If the user 110 deems that a color adjustment is required, a request can be made via the GUI 150.

In response to such a request, the processor 131 can determine (i.e., can be adapted to determine or, more specifically, can be configured to access and execute program code in order to determine) at least one possible solution for adjusting the second color back towards the first color and can generate a second descriptive statement providing a natural language description of the possible solution(s). The GUI 150 can then annotate the object 211 with this second descriptive statement 227*a* (i.e., the GUI 150 can display, on the visual display unit 140 to the user 110, the second descriptive statement 227*a* such that it is associated in some apparent manner with the selected object 211) and further can allow the user to select and initiate one of the possible solution(s), on demand (see the exemplary display screen illustration of FIG. 3). Alternatively, the processor 131 can determine and automatically implement a best possible solution for adjusting the second color back towards the first color and can further generate a second descriptive statement providing a natural language description of the best possible solution, as implemented. The GUI 150 can then annotate the object 211 with this second descriptive statement 227*b* (i.e., the GUI 150 can display, on the visual display unit 140 to the user 110, the second descriptive statement 227*b* such that it is associated in some apparent manner with the selected object 211) (see the exemplary display screen illustration of FIG. 3).

It should be noted that in principle, it is possible to correct a color change if the target color (i.e., the first color) in the selected-for-print-preview version 210*a* of the document falls within the color profile (i.e., is not out of gamut) of the specific printing apparatus 160. Therefore, before proposing possible solutions and/or proposing an implementing a best possible solution, the processor 131 must first verify that the target color is within the color profile of the printer 160. If the target color is not within the color profile of the printer 160, then an improvement of the printed color might still be achieved as follows. Similar to the ring-around concept proposed in U.S. patent application Ser. No. 12/287,122 of Hayward et al., filed on Oct. 6, 2008, assigned to Xerox Corporation of Norwalk, Conn., USA, and incorporated herein by reference in its entirety, color corrections can be made that move the second color closer to the first color, but within the gamut of the printer 160. Two cases can be distinguished and addressed differently: spot colors and other colors.

For example, for spot colors, the user 110 can be presented with and can choose from available spot colors, which are both within the color profile of the printer 160 and which are considered close to the first color. Here the GUI 150 can display for each available spot color, a statement containing the natural language description of the color changes that its selection would imply. Describing the color changes that would be implemented in natural language allows the user to make a choice even in an uncalibrated, nonoptimal, viewing environment.

For other colors, the user 110 can specify the importance of each observed property change and its correction. For instance, if a dark blue (which is out of gamut) became much lighter, less saturated, and more purple, the method can allow the user to specify that rendering blue instead of purple is more important than keeping the same lightness which in turn might be more important than keeping the same saturation. This information can then be used by the print shop pre-press to manually adjust the colors.

Other embodiments of the disclosed color management system 100 are also anticipated. For example, in an alternative embodiment, the first and second digital versions 210*a* and 210*b* comprise different draft versions of the same document. For example, the first digital version 210*a* can comprise an initial version of a document containing a graphic design and the second digital version 210*b* can comprise a color-edited version of the same document containing the same graphic design. By annotating selected object(s) 211 on the display 140 in the manner described above, this embodiment enables tracking of graphic design color-editing even in a less than ideal viewing environment (e.g., in the presence of an improperly calibrated visual display unit and/or less than optimal lighting conditions).

Figure 4:
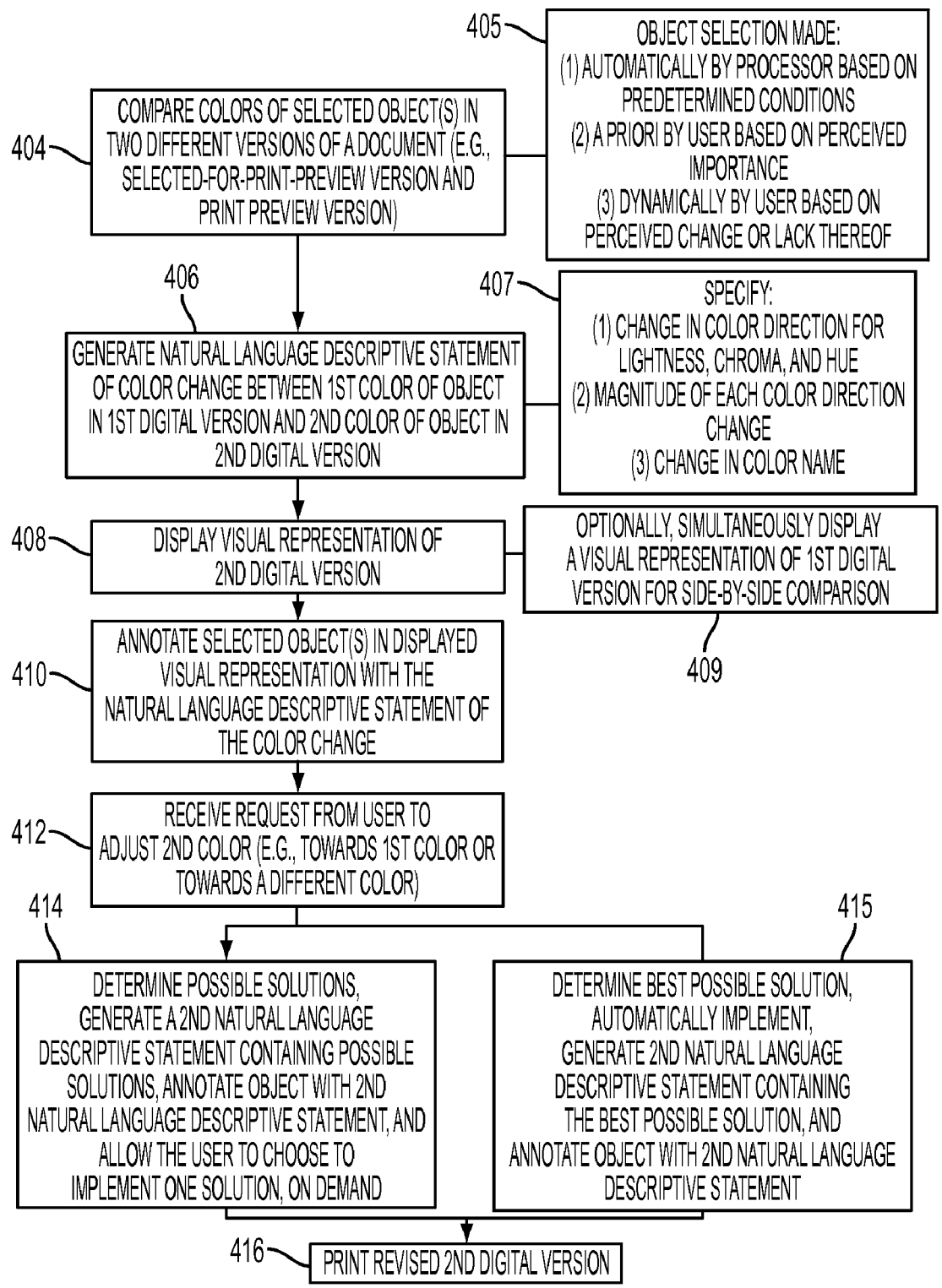
FIG. 4 is a flow diagram illustrating an embodiment of a color management method.

Referring to the flow diagram of FIG. 4 in combination with the system diagram of FIG. 1, also disclosed herein are embodiments of an associated computer-implemented color management method. The color management method embodiments can comprise receiving from a user 110, via GUI 150, a request to compare colors in two different digital versions of the same document (i.e., a first digital version 210*a* and a second digital version 210*b*). For example, the first digital version 210*a* can comprise a selected-for-print-preview digital version of a document (e.g., a specific electronic file stored in memory 132 and selected by a user 110 for print-preview). The second digital version 210*b* can comprise the print-preview digital version of the same document (i.e., a digital version of what the printed document is expected to look like), created based on the selected-for-print-preview digital version and on a color profile of a specific printing apparatus 160 (e.g., a selected or a default printing apparatus). However, it should be noted, as discussed in detail below the embodiments disclosed herein are not limited to printing applications.

The method embodiments can further comprise comparing, by a processor 131, the colors of selected object(s) 211 in these two different versions 210*a* and 210*b* (404). During the comparison process 404 and for each selected object 211, a difference between a first color of the selected object 211 in the first digital version 210*a* and a second color of the same object 211 in the second digital version 210*b* of the document can be determined. Next, a descriptive statement providing a natural language description of any differences between the first color and the second color (including, if applicable, a statement that there are no differences) can be generated (406, see detailed description above regarding statement generation). This descriptive statement can indicate, using a natural language description, any of the following: a difference in lightness between the first color and the second color, a difference in chroma between the first color and the second color, a difference in hue between the first color and the second color (407). The descriptive statement can further indicate, again using a natural language description, the magnitude of any of the above-listed differences (i.e., the magnitude of the difference in lightness, the difference in chroma and/or the difference in hue, or a change in color name) (407). In short, the processes 404-406 compute, summarize and translate the selected object's change in color into a natural language description.

The color management method embodiments can further comprise displaying, on a visual display unit 140 of a graphical user interface 150 (GUI), a visual representation of the second digital version 210*b* of the document (e.g., in PDF format) and further annotating the selected object 211 with the descriptive statement 225 (408). That is, the descriptive statement 225 can also be displayed on the visual display unit such that it is associated in some apparent manner with the selected object 211. For example, as illustrated in FIG. 2, the statement 225 can be displayed in a pop-up window associated, for example, by connector 226 with the selected object 211. Alternatively, the statement 225 can be placed in a given location on the display (e.g., in a side or bottom panel) and both the statement 225 and the selected object can be flagged with the same corresponding reference number, symbol or the like. Optionally, a visual representation of the first digital version 210*b* of the document can be simultaneously displayed (e.g., in PDF format) to allow the user 110 to perform a side-by-side visual comparison in additional to receiving the descriptive statement 225 (409).

After a user 110 has viewed the displayed visual representation, including the descriptive statement 225, a request can be received from a user 110, via the GUI 150, to adjust the second color (e.g., towards the first color or towards a different color, depending upon the application) (412). In response to such a request, at least one possible solution for adjusting the second color, as requested, can be determined. Then, a second descriptive statement providing a natural language description of the possible solution(s) can be generated. The selected object 211 can be annotated with this second descriptive statement 227*a* (i.e., the second descriptive statement 227*a* can be displayed on the visual display unit 140 such that it is associated in some apparent manner with the selected object) and the user 110 can be allowed to select and initiate one of the possible solution(s), on demand (414, see the exemplary display screen illustration of FIG. 3). Alternatively, in response to such a request, a best possible solution for adjusting the second color towards the first color can be determined and automatically implemented. Then, a second descriptive statement 227*b* providing a natural language description of the best possible solution, as implemented, can be generated and the selected object 211 can be annotated with this second descriptive statement (i.e., the second descriptive statement can be displayed on the visual display unit such that it is associated in some apparent manner with the selected object) (415, see the exemplary display screen illustration of FIG. 3).

After color adjustments to the second digital version 210*b* of the document, thereby creating a revised second digital version, the revised second digital version can be physically printed on a print medium, for example, by the specific printing apparatus 160 using toners or inks (416). Thus, the embodiments disclosed herein provide a physical transformation by changing the actual appearance of the printed object from what would have been printed without the aforementioned color adjustments.

It should be noted that the selection of which object or objects from the document will be processed, as described above, can be made automatically based on predetermined conditions, a priori by the user, and/or dynamically by the user (405). That is, the method embodiments can comprise automatically selecting an object from amongst a plurality of objects in a document based on the occurrence of one or more predetermined conditions. These predetermined conditions can include, but are not limited to, the difference between the first color of an object in the first digital version of the document and the second color of that same object in the second digital version of the document exceeding a predetermined color change threshold, the difference between the first color of an object in the first digital version of the document and the second color of that same object in the second digital version of the document crossing a color boundary (e.g., a perceptual color boundary or an analytic color boundary), and the size of an object exceeding a predetermined size threshold. Additionally and/or alternatively, the method embodiment can comprise receiving one or more object selections from a user (i.e., selections of specific object(s) from amongst a plurality of objects in the document) prior to displaying the visual representation (e.g., based on its perceived importance). For example, the selected object may represent a company logo (which must comply with the company color policy), a company product (for which a customer's purchasing decision will be based at least in part on color), etc. Additionally and/or alternatively, the method embodiment can comprise receiving one or more on-demand object selections from a user (i.e., selections of specific object(s) form amongst a plurality of objects in the document) after displaying the visual representation (e.g., based on a perceived color difference or lack thereof).

One particular embodiment of the disclosed color management method can be implemented for soft-proofing in conjunction with a printing application. That is, as discussed above, due to the color profile of a specific printing apparatus 160 (e.g., a selected or a default printing apparatus), the colors of objects in a physically printed-out version of a document may vary from the colors of the same objects in the selected-for-print-preview digital version 210a of that document. As discussed in U.S. patent application Ser. No. 12/138,846 of Roulland et al., incorporated by reference above, and further in U.S. Patent Application Publication No. 2008/0204829 of Harrington, incorporated herein by reference above, this is because printers can only print a finite set of colors. Soft-proofing entails creating a print-preview version 210b of the document (e.g., based on the selected-for-print-preview digital version 210a and on the color profile of the specific printing apparatus 160) and displaying a visual representation of the print-preview digital version 210b in order to inform a user of any color variations that will occur with printing and to allow a user to make adjustments, if desired and possible (e.g., see U.S. Patent Application Publication No. 2007/0008557 of Harrington et al., incorporated herein by reference above). Unfortunately, with such prior-art soft-proofing, if the viewing environment is not ideal, the displayed and/or perceived colors may not be accurate. This embodiment improves upon prior art soft-proofing techniques so that soft-proofing can be performed in less than ideal viewing environments.

Specifically, in this embodiment, the first digital version 210a can comprise a selected-for-print-preview digital version of a document (e.g., a specific electronic file selected by a user for printing) and the second digital version 210b can comprise a print-preview digital version of the same document. This print-preview digital version 210b can be created based on the selected-for-print-preview digital version 210a and on a color profile of a specific printing apparatus 160 (e.g., a selected or a default printing apparatus), using known techniques (e.g., as disclosed in U.S. Patent Application Publication No. 2007/0008557 of Harrington et al., incorporated by reference above).

During the comparison process 404, a difference between a first color of a selected object 211 in the selected-for-print-preview digital version 210a and a second color of the same object 211 in the print-preview digital version 210b of the document can be determined. Then, as discussed in detail above, a descriptive statement providing a natural language description of any differences between the first color and the second color (including, if applicable, a statement that there are no differences) can be generated (e.g., by a processor 131) (406-407). Then, a visual representation of the print-preview digital version 210b of the document can be displayed (e.g., on a visual display unit 140 of a GUI 150) (408, see the exemplary display screen illustration of FIG. 2). Additionally, the selected object 211 can be annotated on the display 140 with the descriptive statement 225 (410). Optionally, a visual representation of the selected-for-print-preview digital version 210a of the document can be simultaneously displayed to allow the user 110 to perform a side-by-side visual comparison in addition to receiving the descriptive statement 225 (409). This embodiment enables quick, effective and remote soft-proofing of the print-preview version 210b of the document even in a less than ideal viewing environment (e.g., in the presence of an improperly calibrated visual display unit and/or less than optimal lighting conditions) because the object 211 is annotated on the display 140 with a descriptive statement 225 of any color differences and the content of this descriptive statement 225 is not impacted by the user's viewing environment. Thus, the user 210 is presented with accurate information regarding any color changes that will occur in the printed document, despite any inaccuracies in the actually displayed and/or perceived colors.

After reviewing the displayed information, including the statement 225, the user 110 can determine the importance of the selected object 211 with respect to the document intent and can further decide if the object's color change is relevant or not (i.e., if a color adjustment is required to move the first color of the object 211 on the print preview version 210b back towards the second color of the object 211 on the selected-for-print-preview version 210b). If the user 110 deems that a color adjustment is required, a request can be made via the GUI 150 (412). In response to such a request, at least one possible solution for adjusting the second color back towards the first color can be determined and a second descriptive statement providing a natural language description of the possible solution(s) can be generated. The selected object 211 can then be annotated with this second descriptive statement 227a (i.e., the GUI 150 can display, on the visual display unit 140 to the user 110, the second descriptive statement 227a such that it is associated in some apparent manner with the selected object 211) and the user 110 can be allowed to select and initiate one of the possible solution(s), on demand (414, see the exemplary display screen illustration of FIG. 3). Alternatively, a best possible solution for adjusting the second color back to the first color can be determined and automatically implemented. Then, a second descriptive statement providing a natural language description of the best possible solution, as implemented, can be generated. The selected object 211 can be annotated with this second descriptive statement 227b (i.e., the GUI 150 can display, on the visual display unit 140 to the user 110, the second descriptive statement 227b such that it is associated in some apparent manner with the selected object 211) (414, see exemplary display screen illustration of FIG. 3).

After color adjustments to the second digital version 210b of the document, thereby creating a revised second digital version, the revised second digital version can be physically printed on a print medium, for example, by the specific printing apparatus 160 using toners or inks (416)

Other embodiments of the disclosed color management method are also anticipated. For example, in an alternative embodiment, the first and second digital versions 210a and 210b comprise different draft versions of the same document. For example, the first digital version 210a can comprise an initial version of a document containing a graphic design and the second digital version 210b can comprise a color-edited version of the same document containing the same graphic design. By annotating selected object(s) 211 on the display 140 in the manner described above, this embodiment enables tracking of graphic design color-editing even in a less than ideal viewing environment (e.g., in the presence of an improperly calibrated visual display unit and/or less than optimal lighting conditions).

It should be understood that the embodiments, described above, apply not only to color applications, but also to black and white applications where color differences may be exhibited as different shades of gray between black and white.

Finally, also disclosed herein are embodiments of a computer program product comprising a computer usable medium having computer useable program code embodied therewith, the computer usable program code being configured to perform the color management method embodiments, as described above, for example, when executed by processor 131 on the computer 130 of FIG. 1. Furthermore, many computerized devices, including but not limited to computer 130, are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus. Such processing units can also be offered as a service from a remote site.

It should be understood that the word "printing apparatus" as used herein encompasses any apparatus, such as a digital copier, bookmaking machine, facsimile machine, multi-function machine, etc. which performs a print outputting function for any purpose. The details of such printing apparatuses are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes as well as inkjet printing processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a color management system and an associated method that display a visual representation of a digital version of a document and further annotate selected object(s) in the visual representation with corresponding statement(s) containing a natural language description of any color differences between the selected object and the same object in a different digital version of the same document. For example, a visual representation of the print-preview version of a document can be displayed and a selected object within the visual representation can be annotated with a statement containing a natural language description of any color differences between the selected object and the same object in the selected-for-print-preview version of the document. By annotating selected object(s) on the display in this manner, the embodiments provide an accurate indication of color variations between the two versions even in a non-calibrated and/or non-optimal viewing environment.

What is claimed is:

1. A color management system comprising:
a processor performing the following:
comparing a first color of an object in a first digital version of a document and a second color of said object in a second digital version of said document;
generating a statement providing a natural language description of a result of said comparing, said statement indicating any lightness differences detected between said first color and said second color, indicating any chroma difference detected between said first color and said second color, indicating any hue difference detected between said first color and said second color; and
generating a second statement providing another natural language description of a plurality of possible solutions for adjusting lightness, chroma and hue of said second color so that said second color more closely matches said first color; and
a graphical user interface in communication with said processor and comprising a visual display unit, said graphical user interface displaying, on said visual display unit, a visual representation of said first digital version of said document and said second digital version of said document, said object in said second digital version displayed on said visual display unit being annotated with said statement and with said second statement such that any of said solutions are user-selectable for on-demand initiation,
wherein said statement enabling soft-proofing of said second digital version of said document by selectively adjusting lightness, chroma and hue of said second color based on said statement in the presence of any of the following: an improperly calibrated visual display unit and less than optimal lighting conditions.

2. The system of claim 1, said statement further indicating a magnitude for at least one of said lightness difference, said chroma difference and said hue difference.

3. The system of claim 1, said statement further indicating a resulting change in color name based on any differences between said first color and said second color in lightness, in chroma and in hue.

4. The system of claim 1, said graphical user interface further receiving, from a user, a request to adjust said second color.

5. The system of claim 1, said object being automatically selected, by said processor, from amongst a plurality of objects in said document based on a predetermined condition.

6. The system of claim 5, said predetermined condition comprising at least one of a difference between said first color and said second color exceeding a predetermined color change threshold, said difference between said first color and said second color crossing at least one of a perceptual color boundary and an analytic color boundary, and a size of said object exceeding a predetermined size threshold.

7. The system of claim 1, said object being one of preselected by said user prior to display of said visual representation by said graphical user interface and dynamically selected by said user after display of said visual representation by said graphical user interface.

8. A color management system comprising:
a processor performing the following:
comparing a first color of an object in a first digital version of a document and a second color of said object in a second digital version of said document, said first digital version being a selected-for-print-preview version, said second digital version being a print-preview version created based on said first digital version and on a color profile of a specific printing apparatus;
generating a statement providing a natural language description of a result of said comparing, said statement indicating any lightness difference detected between said first color and said second color indicating any chroma difference detected between said first color and said second color, indicating any hue difference detected between said first color and said second color; and
generating a second statement providing another natural language description of a plurality of possible solutions for adjusting lightness, chroma and hue of said second color so that said second color more closely matches said first color; and
a graphical user interface in communication with said processor and comprising a visual display unit, said graphical user interface displaying, on said visual display unit, a visual representation of said first digital version of said document and said second digital version of said document, said object in said second digital version displayed on said visual display unit further being annotated with said statement and with said second statement such that any of said solutions are user-selectable for on-demand initiation,
wherein said statement enabling soft-proofing of said second digital version of said document by selectively adjusting lightness, chroma and hue of said second color based on said statement in the presence of any of the following: an improperly calibrated visual display unit and less than optimal lighting conditions.

9. A computer-implemented color management method comprising:
comparing, by a processor, a first color of an object in a first digital version of a document and a second color of said object in a second digital version of said document;
generating, by said processor, a statement providing a natural language description of a result of said comparing, said statement indicating any lightness difference detected between said first color and said second color, indicating any chroma difference detected between said first color and said second color, indicating any hue difference detected between said first color and said second color;
generating, by said processor, a second statement providing another natural language description of a plurality of possible solutions for adjusting lightness, chroma and hue of said second color so that said second color more closely matches said first color; and
displaying, on a visual display unit of a graphical user interface, a visual representation of said first digital version of said document and said second digital version of said document, said object in said second digital version displayed on said visual display unit being annotated with said statement and with said second statement such that any of said solutions are user-selectable for on-demand initiation,
wherein said statement enabling soft-proofing of said second digital version of said document by selectively adjusting lightness, chroma and hue of said second color based on said statement in the presence of any of the following: an improperly calibrated visual display unit and less than optimal lighting conditions.

10. The method of claim 9, said generating of said statement further comprising further indicating in said statement a magnitude for at least one of said lightness difference, said chroma difference and said hue difference.

11. The method of claim 9, said generating of said statement further comprising further indicating in said statement a resulting change in color name based on any differences between said first color and said second color in lightness, in chroma and in hue.

12. The method of claim 9, further comprising receiving, from a user, a request to adjust said second color.

13. The method of claim 9, further comprising automatically selecting said object from amongst a plurality of objects in said document based on a predetermined condition.

14. The method of claim 13, said predetermined condition comprising at least one of a difference between said first color and said second color exceeding a predetermined color change threshold, said difference between said first color and said second color crossing at least one of a perceptual color boundary and an analytic color boundary, and a size of said object exceeding a predetermined size threshold.

15. The method of claim 9, further comprising any one of the following: prior to said displaying of said visual representation, receiving an object selection from a user; and after said displaying of said visual representation, receiving said object selection from said user.

16. The method of claim 9, said first digital version being a selected-for-print-preview version and said second digital version being a print-preview version created based on said first digital version and on a color profile of a specific printing apparatus.

17. A non-transitory computer-readable storage medium having computer usable program code stored thereon, said computer usable program code being executable by a computer to perform a color management method comprising:

comparing a first color of an object in a first digital version of a document and a second color of said object in a second digital version of said document;

generating a statement providing a natural language description of a result of said comparing, said statement indicating any lightness difference detected between said first color and said second color, indicating any chroma difference detected between said first color and said second color, indicating any hue difference detected between said first color and said second color;

generating a second statement providing another natural language description of a plurality of possible solutions for adjusting lightness, chroma and hue of said second color so that said second color more closely matches said first color; and displaying, to a user on a visual display unit of a graphical user interface, a visual representation of said first digital version of said document and said second digital version of said document with said object in said second digital version displayed on said visual display, wherein said statement enabling soft-proofing of said second digital version of said document by selectively adjusting lightness, chroma and hue of said second color based on said statement in the presence of any of the following: an improperly calibrated visual display unit and less than optimal lighting conditions.

* * * * *